United States Patent [19]

Hinman et al.

[11] 4,398,395

[45] Aug. 16, 1983

[54] CARBONATED ICE PROCESS AND PRODUCT

[75] Inventors: David C. Hinman, Tarrytown, N.Y.; Valery B. Zemelman, Wilton, Conn.; William R. Ramakka, Little Ferry, N.J.

[73] Assignee: General Foods Corporation, White Plains, N.Y.

[21] Appl. No.: 326,888

[22] Filed: Dec. 2, 1981

[51] Int. Cl.³ .............................................. F25C 1/00
[52] U.S. Cl. ............................................ 62/1; 62/69
[58] Field of Search ........................... 62/1, 48, 69, 70

[56] References Cited

U.S. PATENT DOCUMENTS

| | | | |
|---|---|---|---|
| 2,575,509 | 11/1951 | Bayston | 62/1 X |
| 2,975,603 | 3/1961 | Barnes et al. | 62/1 |
| 3,086,370 | 4/1963 | Barnes et al. | 62/1 |
| 3,217,503 | 11/1965 | Mitchell et al. | 62/48 |
| 3,220,204 | 11/1965 | Adler et al. | 62/70 |
| 3,255,600 | 6/1966 | Mitchell et al. | 62/69 |
| 3,333,969 | 8/1967 | Mitchell et al. | 99/192 |
| 4,333,315 | 6/1982 | Zemelman et al. | 62/1 |
| 4,347,707 | 9/1982 | Zemelman et al. | 62/1 X |

OTHER PUBLICATIONS

H. W. Herreilers, *Het Systeem $CO_2$–$H_2O$*, Ph.D. Thesis, University of Amsterdam, 1936 (English translation of title page and Chapter VIII, "Summary").

Copending U.S. patent application, filed concurrently by Kleiner et al., entitled "Process for Preparing Gasified Ice of Improved Stability".

Miller and Smythe, "Carbon Dioxide Clathrate in the Martian Ice Cap", *Science,* 170, Oct. 30, 1970, pp. 531–533.

Adamson and Jones, "Physical Adsorption of Vapors on Ice", *Journal of Colloid and Interface Science,* 37(4), 1971, pp. 831–835.

*Primary Examiner*—William E. Tapolcai, Jr.
*Attorney, Agent, or Firm*—Joyce P. Hill; Thomas R. Savoie; Daniel J. Donovan

[57] ABSTRACT

The present invention provides an improved process for preparing carbonated ice directly from finely divided water ice or snow. According to the process, water ice is contacted with carbon dioxide gas at a temperature within the range of from about −20° C. to about 0° C. at a pressure of about 0.3 times the carbon dioxide vapor pressure at the respective temperatures, the pressure being at least sufficient to cause formation of carbon dioxide hydrate, but insufficient to liquefy the carbon dioxide, at the temperature of contact; and maintaining contact for a period of time effective to form carbon dioxide hydrate in the ice. At the preferred temperatures of from −14° to −2° C., the reaction rate increases dramatically.

15 Claims, No Drawings

CARBONATED ICE PROCESS AND PRODUCT

TECHNICAL FIELD

The present invention relates to the preparation of carbonated ice products; and particularly, to an improved process which enables the rapid formation of carbon dioxide hydrate by contacting solid water ice or snow with gaseous carbon dioxide.

Gasified ice products are known which, due to the binding of the gas within a chemical gas hydrate complex, have enabled delivery of high volumes of gas from relatively small volumes of ice. These products have shown potential for storage and transport of gases of many types. Typically, the gas will be carbon dioxide and the product will be employed to carbonate an aqueous liquid in the simplified home preparation of carbonated beverages.

For the greatest economy and convenience, it is desirable to incorporate high levels of gas. Unfortunately, the preparation of products having desirably high gas contents at practical rates has heretofore required the use of liquid water which must then be frozen after reaction under high pressures by a highly inefficient process. The form containing the maximum gas content, namely the pure hydrate form, can be achieved by such processes but it is not practical to do so.

BACKGROUND ART

Most typically, the preparation of carbonated ice has in its simplest form entailed contacting an aqueous liquid with gaseous carbon dioxide under highly elevated pressures for a period of time sufficient to form a desired level of carbon dioxide hydrate, and then cooling to freeze the resulting product. Such a gas-liquid contact process is disclosed by Barnes et al in U.S. Pat. Nos. 2,975,603; 3,086,370; and 3,217,503.

According to the specific example disclosed in the first-mentioned Barnes et al patent, water was contacted with gaseous carbon dioxide at a pressure of 400 psig at a temperature just above 0° C. After 75 minutes, the vessel was removed from the bath, cooled to freeze the contents, depressurized and opened. Because the entire contents of the reactor must be frozen to achieve a stable product, and the heat transfer characteristics of the aqueous suspension of carbon dioxide hydrate within the reactor are inferior to pure water, freezing is inefficient. Additionally, the freezing must be conducted under a suitably elevated pressure; and in the case of these Barnes et al patents, freezing is conducted within the reactor vessel itself. This freezing step, therefore, severely limits productivity for a given reactor volume. The disclosures of the other two Barnes et al patents are similar in this regard. Moreover, pure hydrate could not be prepared.

Adler et al stated in U.S. Pat. No. 3,220,204, that, while the prior art procedures of Barnes et al produce carbonated ice which retains significantly high levels of carbonation during refrigerated storage, the carbonated ice had a tendency to explode or pop (i.e., break apart and disintegrate with a loud noise) at an unpredictable point of time during dissolution. They indicated when the Barnes et al carbonated ice products were added to water or milk, they frequently exploded in the glass. Their solution to the problem entailed preparing a suspension of hydrate in aqueous liquid in one vessel by maintaining a high liquid surface to gas contact during reaction, and then transferring the suspension to a separate freezing zone. It is disclosed that, as a practical matter, in order to operate under controllable conditions, hydrate will be produced at pressures above 200 psig and a temperature above 0° C. in order to maximize hydrate formation while minimizing collateral formation of water ice. Like the process of Barnes et al, the unreacted aqueous liquid had to be frozen while under pressure. Moreover, transfer to the freezing zone was difficult where high levels of carbon dioxide were entrapped within the product. And, again, pure hydrate could not be prepared even though they suggested removing all possible water by pressing.

In U.S. Pat. No. 3,333,969, Mitchell et al disclosed that the problem of uneven release of carbon dioxide persisted throughout all prior art gasified ice products. They indicated that an important problem present in the handling and use of carbonated ice, particularly in the range of from 10 to 118 volumes of $CO_2$ per gram of ice, was an uneven release of carbon dioxide from the carbonated ice. To eliminate the problems of popping and splashing, Mitchell et al proposed subdividing carbonated ice into discrete particles while maintaining the temperature of the ice below 0° C., and then contacting the discrete particles to form them into an adhered mass or briquette. Briquetting produced a gasified ice product having a commercially satisfactory mechanical strength in the frozen state and also liberated entrained gas bubbles which are believed to cause the undesirable, spontaneous popping, and exploding phenomena. This process improved the uniformity of the end-product, but did not address the problem of the inefficiency of the freezing step, and the briquetting step actually reduced the level of gas in the final product and increased the rate of loss of $CO_2$.

In U.S. Pat. No. 3,255,600, Mitchell et al disclosed that liquid carbon dioxide could be employed in place of gaseous carbon dioxide for preparing a carbonated ice product. According to the disclosed process, liquid carbon dioxide and either liquid water or water ice are mixed under controlled conditions to form a carbonated ice product which is then cooled to below the freezing point, preferably by simply venting carbon dioxide gas to the atmosphere and taking advantage of the cooling effect of the expanding gas. According to claim 3, a carbonated ice product characterized by a high carbon dioxide content and a long storage life is prepared by initially mixing liquid carbon dioxide with ground water ice in a closed reaction vessel. The head space in the vessel is maintained at a pressure above 500 psig while the mixture is agitated. The temperature of the mixture rises from 0° C. to a maximum of approximately 11° C. and the pressure in the reaction vessel increases to a maximum of approximately 655 psig during the course of the reaction period. The reaction is continued until the pressure and temperature values start to decrease. The disclosure indicates that venting produces a carbonated ice product in the form of a highly carbonated snow in 30 seconds. However, because the reaction temperature is above the freezing point of the unreacted water, the entire reaction mixture must be frozen to stabilize the resulting product. And, the vaporization of liquid carbon dioxide to provide cooling is very energy intensive and inefficient.

The literature has also suggested the possibility that carbon dioxide hydrate could be formed by a gas-solid process at extremely low temperatures e.g., about −70° C. to −40° C. However, these references indicated a strong pressure dependence on the stability of the products; and, the decomposition rates, if extrapolated to those encountered in normal home or commercial refrigeration equipment, would be enormously high.

Miller and Smythe in Science, Vol. 170, Oct. 1970, Pages 531-533, discussed the formation of carbon dioxide hydrate by a gas-solid process at $-73°$ C. to $-43°$ C. and studied the kinetics of decomposition between $-121°$ C. and $-101°$ C. To prepare the hydrate, finely-divided ice was obtained by grinding ice under liquid nitrogen with a mortar and pestle and by condensing water from air at $-195°$ C. The ice was degassed at $-43°$ C., and hydrate was prepared in a vacuum line at temperatures between $-73°$ C. and $-43°$ C. The temperature was then brought to the desired value for studying decomposition, and the equilibrium was approached from both the high- and low-pressure sides of the dissociation pressure.

Adamson and Jones, in *Journal of Colloid and Interface Science*, Volume 37, No. 4, December 1971, at Pages 831-835, also studied the preparation of carbon dioxide hydrate at low temperatures. For samples of ice prepared by quenching a hot steam jet in liquid nitrogen, a strongly-pressure-dependent absorption region was identified within the range of from about $-83°$ C. to $-73°$ C. They indicated that their data was consistent with that of Miller and Smythe.

It is apparent from the foregoing discussion of the prior art that studies were made in temperature ranges much lower than those disclosed in this invention and the anomalous increase in the rate of reaction at temperatures below the freezing point of water was never observed. Thus, the prior art has not enabled the preparation of high purity, high gas content hydrates other than by the use of processes which are inefficient in terms of energy consumption, reaction rates or projected product stability under ordinary storage temperatures.

Experience shows that the step of freezing the reaction product of water or water ice reacted at temperatures above 0° C. requires the use of equipment which is less than optimum in design than that which is presently commercially available for freezing water ice at ordinary temperatures.

Where the prior art has employed water ice as a starting material, it was necessary, in the case of U.S. Pat. No. 3,255,600, to carry out the reaction at a temperature above the freezing point of water ice, and to still require a significant amount of cooling to refreeze the reaction mixture.

Where water ice has been reacted with gaseous carbon dioxide in the past, the reactions have progressed slowly and have been conducted at excessively low temperatures—requiring further expenditure of energy. This prior art indicates that products prepared by contacting water ice with gaseous carbon dioxide would be highly unstable when elevated to temperatures more typically encountered in home and commercial refrigeration devices.

Thus, there remains a current need for a process capable of producing high-gas-content or essentially-pure gas hydrate with increased efficiency.

DISCLOSURE OF INVENTION

In accordance with the present invention, there is provided an improved process for preparing carbonated ice products characterized by high gas contents, and a uniform, vigorous effervesence when placed in water.

Also provided is the product of this process. In its broader aspects, the process comprises: contacting ice with carbon dioxide gas at a temperature within the range of from about $-20°$ C. to about 0° C. at a minimum pressure of about 0.3 times the $CO_2$ vapor pressure at the respective temperatures. For example, at $-20°$ C. a pressure of about 100 psig is used, the pressure being at least sufficient to cause formation of carbon dioxide hydrate, but insufficient to liquefy the carbon dioxide, at the temperature of contact; and maintaining contact for a period of time effective to form carbon dioxide hydrate.

The invention will be better understood, and its advantages will become more apparent from the following detailed description, especially when read in light of the examples herein.

BEST MODE FOR CARRYING OUT THE INVENTION

The present invention provides a carbonated ice product characterized by a high gas content, a vigorous, uniform evolution of gas when placed in an aqueous liquid, and a quiet non-popping, non-explosive character when exposed to ambient air. High gas contents, approaching essentially pure carbon dioxide hydrate, can be achieved in practical periods of time with good efficiency.

The invention takes advantage of the discovery that ordinary water ice, which can be formed utilizing highly-efficient commercial ice or snow making equipment, can be rapidly and effectively gasified by direct contact with gaseous carbon dioxide at moderate contact conditions. Additionally, the present invention takes advantage of the discovery that the rate of reaction of carbon dioxide gas with water ice increases dramatically in the temperature range of from about $-14°$ C. to about 0° C. The invention, thus, not only achieves efficiency through the novel adaptation of the energy-efficient production of water ice according to known technology, in a manner not previously thought practical, but also provides yet further improvement by the discovery that operating within the newly-defined temperature range of this invention provides anomalous reaction rates which are commercially satisfactory, while prior art reactions of gaseous carbon dioxide with water ice are reported at much lower temperatures with no reliable indication of the rate of formation.

In carrying out the process of this invention, the gasified ice products will preferably be prepared from pure water ice. Although some advantages in terms of reproducibility of precise conditions and stability of the final product may be obtained by using ice prepared by freezing distilled or deionized water, the process of the present invention is not limited to these. The person of ordinary skill in the art may employ various types of solutions, and in the case of food products such as beverages, various materials including sugar, color, flavor, acidulents, and the like, knowing that the ease of process control or the stability of the final product may be decreased. Thus, the terms ice and water ice will hereinafter be employed to include ice containing added materials such as these mentioned, as well as frozen water per se.

The water ice is preferably formed continuously or semi-continuously by a commercial snow-making or ice-making machine. Where ice is formed as cubes or other large pieces, it is preferred to increase the specific surface of the ice by grinding, crushing, shaving, or otherwise comminuting. The size of the ice particle is a key factor in determining the rate of hydrate formation. The smaller the ice particle, the faster the rate of hydrate formation. Preferably, the ice will exhibit a specific surface of greater than about 80 square centimeters, and preferably greater than about 1500 square centimeters, per gram of bulk ice. The volume of bulk ice will comprise the volume of solid ice plus any void space. Thus, the term "solid ice" means only the actual volume of ice within the product, excluding all void space within the high-specific-surface bulk ice.

The ice can be granular and free-flowing or in the form of a porous, cohesive mass. Where the ice is in the form of free-flowing particles, it will preferably comprise particles small enough that substantially all pass through a 20-mesh U.S. Standard sieve, and preferably the particles will be small enough to pass through a 325-mesh U.S. Standard sieve. Where the ice is in the form of a porous, cohesive mass, it preferably will exhibit a bulk density of from about 0.20 to 0.85 grams, and preferably from about 0.50 to about 0.80 grams, per cubic centimeter. The porous form of the ice can be achieved by compressing particulate ice, much in the manner of Mitchell et al in U.S. Pat. No. 3,333,969, sintering ice particles or by foaming and freezing.

In the initial stage in processing, ice is contacted with gaseous carbon dioxide at a temperature within the range of from about $-20°$ C. to about $0°$ C. at a pressure of about 0.3 times the $CO_2$ vapor pressure at the respective temperatures, this pressure being at least sufficient to cause formation of carbon dioxide hydrate, but insufficient to liquefy the carbon dioxide at the temperature of contact. The reaction temperature is important because the reaction rate increases dramatically just below the freezing point of ice. The pressure, on the other hand, is less of a factor once a threshold value is achieved beyond which the rate of reaction is diffusion-controlled.

The contact step is carried out in any reactor capable of withstanding the pressures and temperatures required. Typically, the ice will be charged into a pressure reactor at a temperature below the freezing point, and preferably within a few degrees of the selected temperature of contact of between $-20°$ C. and $0°$ C. Preferably, the temperature during contact is maintained within the range of from $-14°$ C. to $-2°$ C. The temperature can be controlled by controlling the temperature of the gas alone, or, if desired, heat exchange means can be employed.

The pressure during contact will be at a level at least sufficient to cause formation of carbon dioxide hydrate, but insufficient to liquefy the carbon dioxide, at the temperature of contact. The pressure must be above the threshold value for reaction at the temperature of contact, this threshold value being essentially defined by the equilibrium line between the gaseous carbon dioxide-solid water and the gaseous carbon dioxide-solid water-carbon dioxide hydrate regions as defined by the $CO_2$-water-hydrate phase diagram described by H. W. Herreilers, Ph.D. Thesis, University of Amsterdam (1936). This threshold value for hydrate formation pressure is calculated as being 0.3 times the $CO_2$ vapor pressure at a given temperature. Typically, there is no discernable effect of pressure on either the kinetics of the reaction or the composition of the reaction mixture. In cases where the pressure is raised gradually, there is no hydrate formation until the equilibrium line on the phase diagram is crossed. At this point, carbon dioxide hydrate formation proceeds smoothly, following a diffusion-limited rate curve to a point of completion corresponding approximately to the composition $CO_2.6H_2O$. Some experiments have approached the theoretical value of $CO_2.5.75H_2O$. Further increases in the pressure do not result in additional carbon dioxide gain. Moreover, increases in the pressure to greater than the carbon dioxide condensation line on the noted phase diagram will result in the formation of liquid carbon dioxide and should be avoided to achieve the best product uniformity and economics of the reaction.

One useful guide to selecting an efficient pressure for contact is to maintain the ratio $P/P_o$, where P is contact pressure and the $P_o$ is the condensation pressure of carbon dioxide at the contact temperature, within the range of from about 0.3 to about 0.99. Preferably, the contact pressure will be maintained at the lower end of the above range since no further formation rate advantage accrues to using a higher ratio of contact pressure to condensation pressure, as shown in the table below.

Influence of Contact Pressure Changes on Rate of $CO_2$ Hydrate Formation (Contact Conditions: Time, 60 minutes; Temperature, $-5°$ C.; $CO_2$ Condensation Pressure ($P_o$), 428 psig, Particle size, $-20$ to $+40$ U.S. Standard mesh)

| Contact Pressure (P) (psig) | $P/P_o$ | Volumes of $CO_2$ in Hydrate (cm$^3$/g) |
|---|---|---|
| 100 | 0.25 | 0 |
| 200 | 0.45 | 90 |
| 215 | 0.50 | 70 |
| 290 | 0.67 | 92 |
| 350 | 0.82 | 89 |
| 375 | 0.87 | 90 |
| 385 | 0.90 | 96 |

The above data show that when $P/P_o$ is less than 0.30 essentially no hydrate formation occurs during the 60 minutes of solid ice/gas contact, whereas when $P/P_o$ is greater than 0.30, from 70–96 volumes of $CO_2$ per gram of ice is chemically incorporated into a gas hydrate product during the same 60 minute contact time.

The contact between the gaseous carbon dioxide and the ice is maintained for a period of time effective to form carbon dioxide hydrate in the ice. The exact time required for hydrate formation at a sufficiently practical level for uses such as carbonating beverages, depends upon a number of factors including the temperature of contact and the specific surface of the ice, as detailed above, provided that the reaction pressure is greater than the threshold pressure for hydrate formation. It is also noted that the water ice formation, either as crystalline or amorphous ice can affect the rate of hydrate formation; amorphous water ice gives a faster rate of formation.

Because one of the objects of the invention is to prepare gasified ice products having high gas contents, the contact between the gaseous carbon dioxide and the ice is preferably maintained for a period of time effective to achieve a level of carbon dioxide hydrate sufficient to provide at least 25 milliliters of carbon dioxide gas per gram of solid water ice, the volume of carbon dioxide being measured by evolution and measurement at standard conditions of temperature and pressure. Preferably, the contact will be maintained for a period of time effective to form sufficient carbon dioxide hydrate to provide a product containing at least 50 volumes of carbon dioxide per gram of solid water ice. It is an advantage of the present invention, that carbon dioxide levels of greater than 100, and as high as from 120 to about 150, milliliters of carbon dioxide per gram of solid carbonated ice can be achieved. Practical levels of hydrate formation are typically achieved within a time of from about 5 minutes to about 2 hours of contact.

The following examples are presented for the purpose of further illustrating and explaining the present invention and are not to be taken as limiting in any regard. Unless otherwise indicated, all parts and percentages are by weight, based upon the weight of the product or reactants at the indicated point in processing.

EXAMPLE 1

This example describes the preparation of carbon dioxide hydrate according to the present invention and illustrates the unexpected increase in rate of reaction achieved at temperatures immediately below the freezing point of water.

Ordinary water ice is prepared in an ice cube maker and is ground and sieved to pass through a 20-mesh U.S. Standard sieve and to be held on a 40-mesh U.S. Standard sieve. Samples of approximately 0.4 grams are placed in a sealed metal reactor. A measured sample of carbon dioxide gas is then placed in contact with the ice sample and held at constant pressure. The uptake of carbon dioxide is measured as a function of time for a range of temperature and pressure. The table below shows the rate of carbon dioxide uptake into the ground and sieved ice. The last column of the table expresses the rate of carbon dioxide uptake in terms of the time required to reach a carbon dioxide level of 50 milliliters at standard temperature and pressure per gram of solid ice.

| Temperature (°C.) | Pressure (psig) | $P/P°$ | Time @ $V' = 50$ ml/g minutes |
|---|---|---|---|
| −4.8 | 390 | 0.90 | 5 |
| −8.0 | 350 | 0.90 | 12 |
| −13.4 | 300 | 0.90 | 92 |
| −18.2 | 260 | 0.90 | 120 |

These results show that there is a marked change in the rate of carbon dioxide uptake as the temperature is changed upwards from −13° C. to −8° C.

EXAMPLE 2

Using the equipment described in Example 1, ice cubes are prepared, ground in a Waring blender (which has been chilled with dry-ice) to a particle size small enough so that substantially all of the ground ice particles pass through a 120 mesh U.S. Standard sieve.

Samples of the ground uncarbonated ice particles are tabletted at 1000, 2500, 5000 and 10,000 psig. These tablets are carbonated along with a sample of non-tabletted ice particles for 1 hour and 45 minutes at −15.7° C. and 350 psig. The resulting analyses of the samples are as follows:

| Water Ice Particles Tabletting Pressure (psig) | $\dfrac{cm^3 CO_2}{gm}$ @ STP |
|---|---|
| 0 | 76.6 |
| 1000 | 73.7 |
| 2500 | 72.7 |
| 5000 | 65.2 |
| 10,000 | 50.2 |

The data in Example 2 shows that the accessibility of surface is not negatively affected by compaction with pressures up to 2500 psig. Thus, reactor capacity for output of gasified ice hydrate can be significantly increased by compacting fine particles of ice or snow before contacting the solid ice particles with carbon dioxide gas.

The above description is for the purpose of teaching the person skilled in the art how to practice the present invention. This description is not intended to detail all of the obvious modifications and variations of the invention which will become apparent to the skilled worker upon reading. However, applicant does intend to include all such obvious modifications and variations within the scope of his invention which is defined by the following claims.

We claim:

1. A process for preparing carbon dioxide hydrate which comprises:
   (a) contacting water ice with a carbon dioxide gas at a temperature within the range of from about −20° C. to about 0° C. at a pressure of about 0.3 times the $CO_2$ vapor pressure at the respective temperatures, the pressure being at least sufficient to cause formation of carbon dioxide hydrate, but insufficient to liquefy the carbon dioxide; and
   (b) maintaining contact for a period of time effective to form carbon dioxide hydrate in the ice.

2. A process according to claim 1 wherein the water ice exhibits a specific surface of greater than about 80 square centimeters per gram of bulk water ice.

3. A process according to claim 2 wherein the water ice exhibits a specific surface of greater than about 1500 square centimeters per gram of bulk water ice.

4. A process according to claim 2 wherein the water ice comprises particles small enough that substantially all pass through a 20 mesh U.S. Standard sieve.

5. A process according to claim 2 wherein the ice comprises a porous, cohesive mass having a bulk density of from about 0.20 to about 0.85 grams per cubic centimeter.

6. A process according to claim 1 wherein the contact is maintained for a period of time sufficient to obtain a carbon dioxide content of at least 25 milliliters per gram of solid carbonated ice.

7. A process according to claim 1 wherein the temperature during contact is maintained within the range of from −14° C. to −2° C.

8. A process according to claim 1 wherein the pressure during contact is maintained at a level effective to provide a ratio $P/P_o$, where P is the contact pressure and $P_o$ is the condensation pressure of carbon dioxide at the contact temperature, of from about 0.30 to about 0.99.

9. A process according to claim 7 wherein the contact pressure is maintained at a $P/P_o$ ratio of about 0.30.

10. A process according to claim 9 wherein the temperature during contact is maintained within the range of from −14° C. to −2° C.

11. A process according to claim 10 wherein the contact is maintained for a period of time sufficient to obtain a carbon dioxide content of at least 25 milliliters per cubic centimeter of solid carbonated ice.

12. A process according to claim 11 wherein the ice exhibits a specific surface of greater than 80 square centimeters per gram of bulk water ice.

13. A process according to claim 12 wherein the ice comprises particles small enough that substantially all pass through a 20 mesh U.S. Standard sieve.

14. A process according to claim 12 wherein the water ice comprises a porous cohesive mass having a bulk density of from about 0.20 to about 0.85 grams per cubic centimeter.

15. A product prepared according to the process of claim 1.

* * * * *